M. T. DENNE.
MACHINE FOR ROUNDING OR TRIMMING BOOT AND SHOE OUTER SOLES OR THE LIKE.
APPLICATION FILED SEPT. 1, 1911.

1,176,741.

Patented Mar. 28, 1916.
5 SHEETS—SHEET 1.

Witnesses:

Inventor,
Mark T. Denne,
by Edward Heard Smith,
Attys.

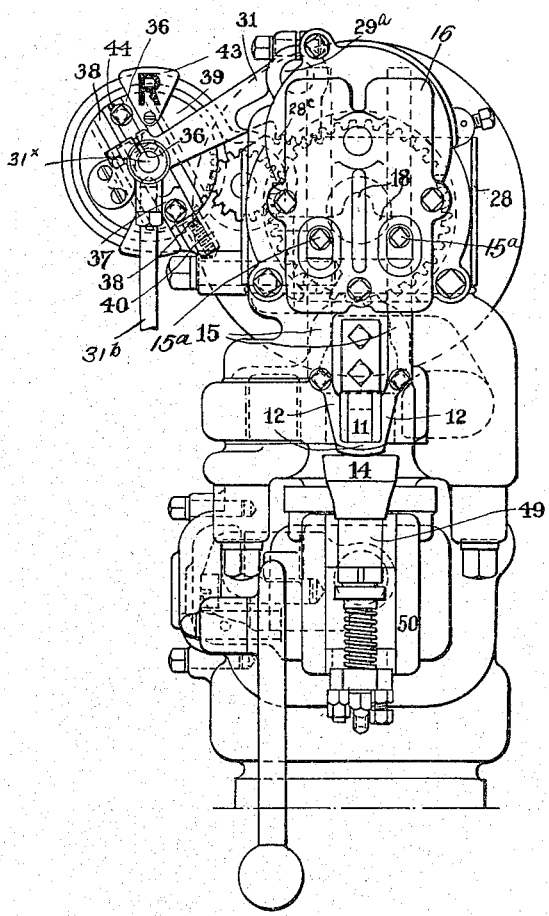

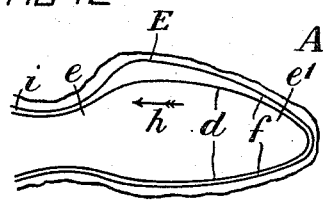
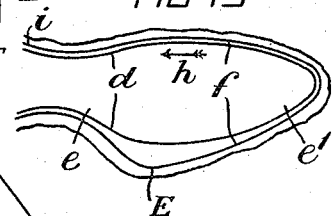
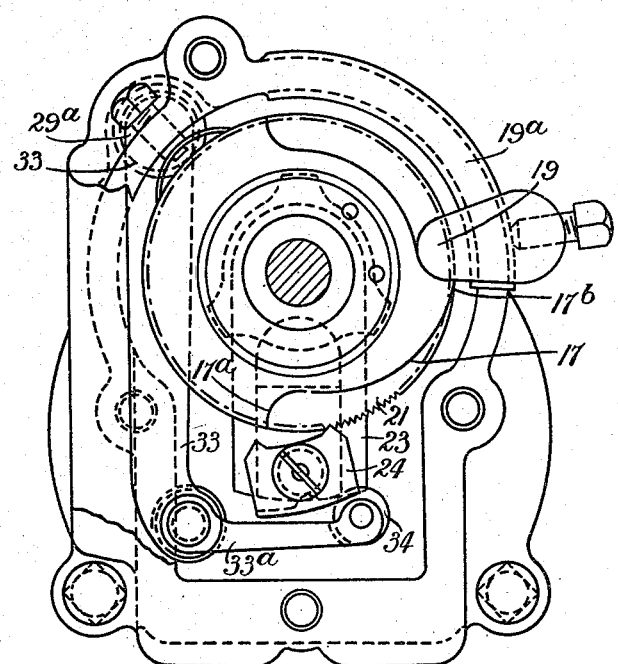

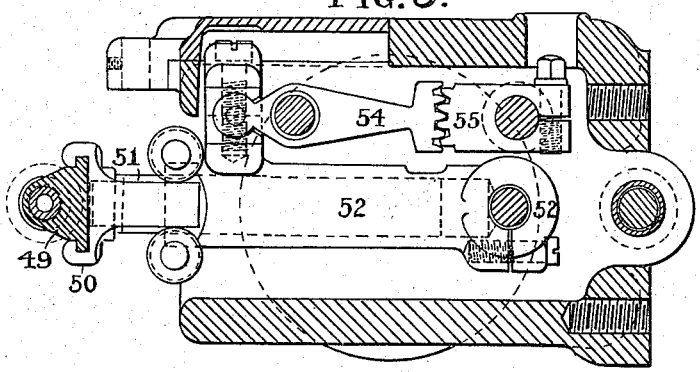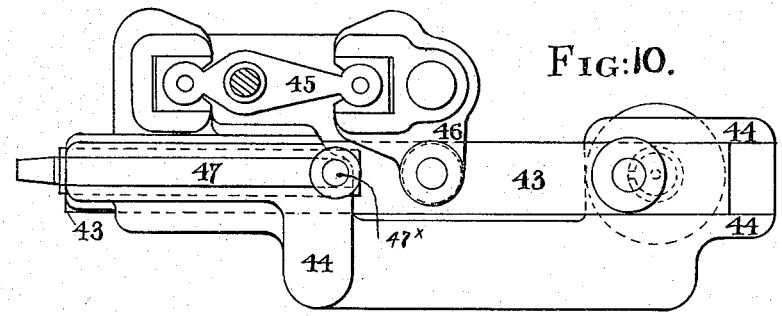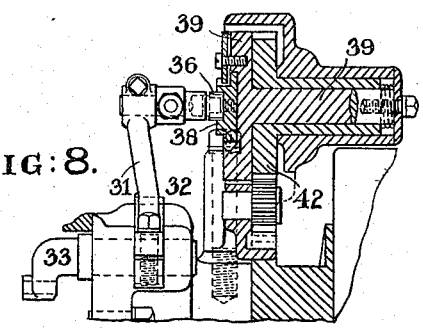

UNITED STATES PATENT OFFICE.

MARK THOMAS DENNE, OF RUSHDEN, ENGLAND.

MACHINE FOR ROUNDING OR TRIMMING BOOT AND SHOE OUTER SOLES OR THE LIKE.

1,176,741.      Specification of Letters Patent.      Patented Mar. 28, 1916.

Application filed September 1, 1911. Serial No. 647,159.

*To all whom it may concern:*

Be it known that I, MARK THOMAS DENNE, a subject of the King of Great Britain and Ireland, residing at Rushden, Northamptonshire, England, have invented new and useful Improvements in Machines for Rounding or Trimming Boot and Shoe Outer Soles and the like, of which the following is a specification.

In the specification of the United States Patent No. 837287 dated December 4th, 1906, granted to me, a machine for rounding or trimming the sole edges of boots and shoes for producing what are known in the trade as "Baltimore" edge boots and shoes is described in which the movement of a work guide relatively to the trimming knife is controlled by a crank the latter having movement imparted to it first in one direction to, say, bring about a quick increase in the width of the projecting sole edge as trimmed by the trimming knife and then in the opposite direction to bring about a slower or more gradual decrease in the width of the projecting sole edge the degree of curvature in both directions being determined by means of stops adjusted by the operator and against which the operator moves a knee lever.

My present invention is an improvement on that machine in that *inter alia* I provide means whereby after trimming the sole edge say of a right boot or shoe the machine will automatically adapt itself to similarly trim the sole edge of the left boot or shoe, the swelled portion of the sole edge being of course in each case on the outer ball portion of the boot or shoe.

An embodiment of my invention is illustrated in the accompanying drawings, wherein:—

Figure 1:
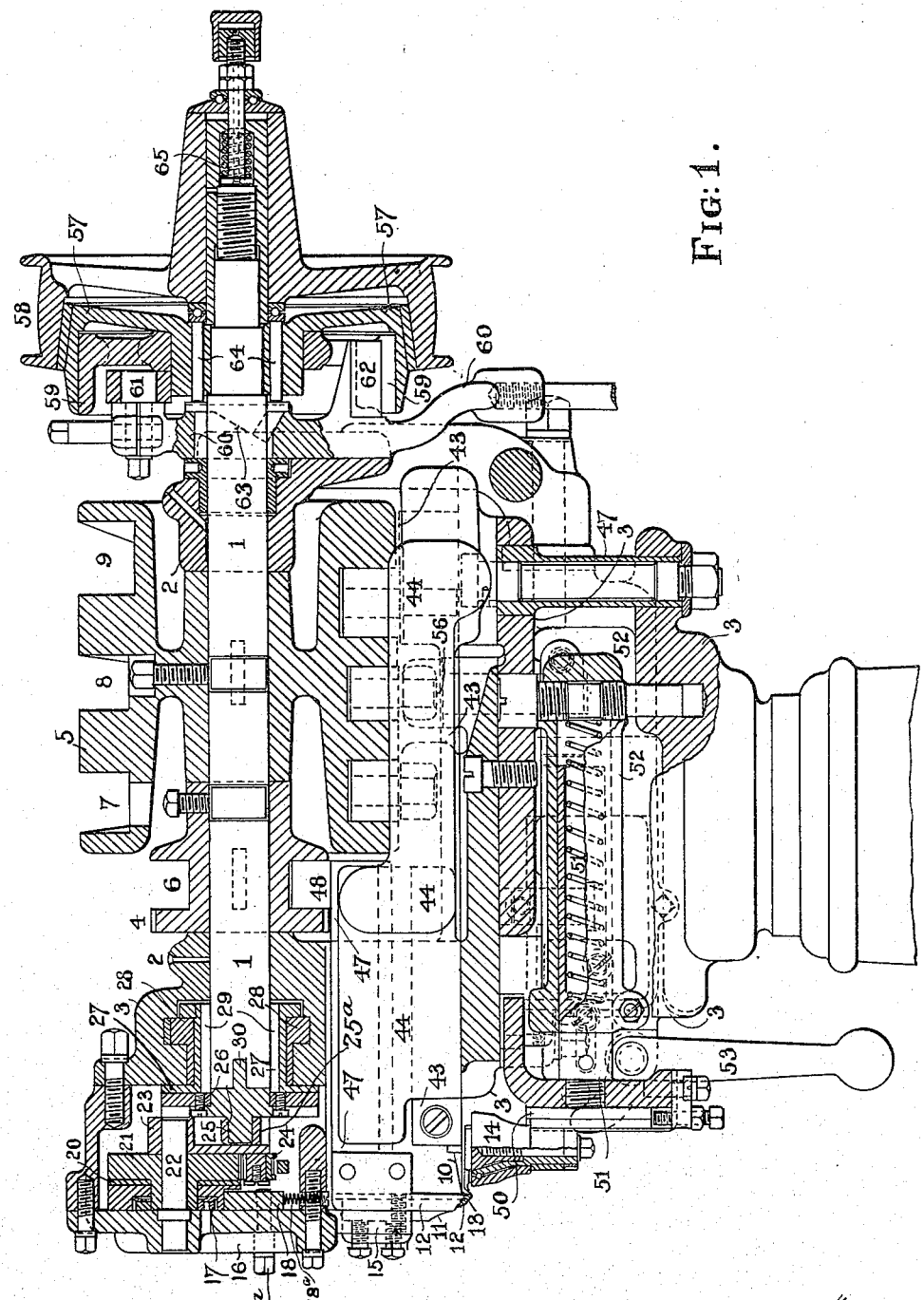
Figure 4:
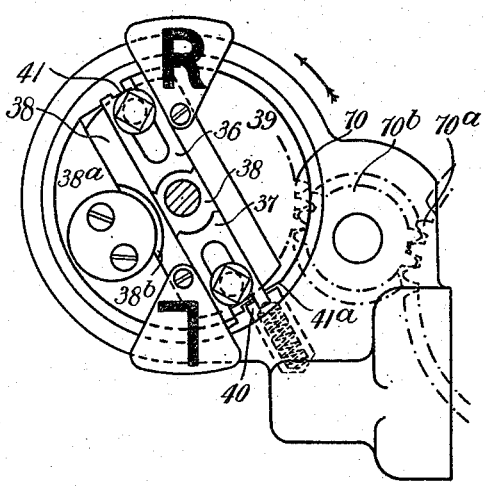
Figure 6:
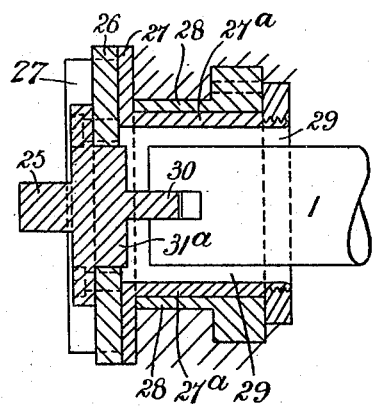
Figure 5:
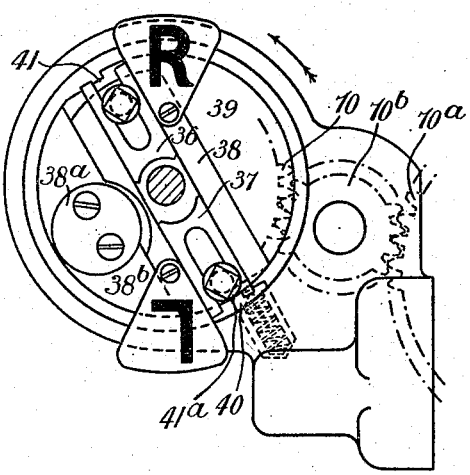
Figure 7:
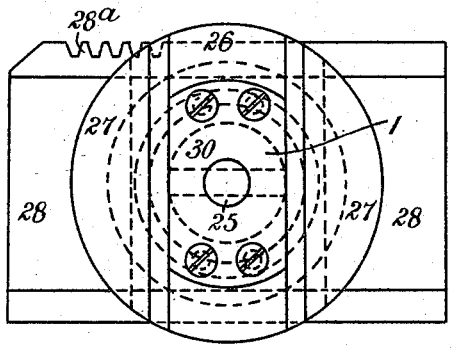

Figure 1 is a sectional side elevation of the head of the machine. Fig. 2 is a front elevation thereof. Fig. 3 is a front view of the cam or equivalent whereby vertical movement is imparted to the crease guide, also the stop whereby the extent of movement of said cam can be limited to less than its full extent and the means for imparting movement to said cam. Figs. 4 and 5 show the arrangement of stops whereby the desirable different limitations in the speed of movement of the cam or equivalent are to be attained. Figs. 6 and 7 are a front and sectional side elevation respectively of the means for producing variations in the throw of a pawl lever whereby the speed of movement of the cam is determined. Fig. 8 is a plan, partly in section, of the stop gearing for limiting the speed at which the edge gage is moved. Figs. 9 and 10 are details of mechanism having to do with that part of the machine which forms no part of the present invention. Fig. 11 is a diagrammatic illustration of one form of the invention as applied to a sole-edge trimming machine. Figs. 12 and 13 are diagrammatic illustrations of a "left" and a "right" boot sole respectively.

Referring to Figs. 1–10, the numeral 1 indicates the main or cam shaft of the machine supported in bearings 2 on the head 3 of the machine and having mounted thereon cam cylinders 4, 5 formed with cam grooves 6, 7, 8, 9 from which the usual movements are imparted to the trimming knife 10, channeling knife 13 presser foot roll 14 and cutting block 11 to effect the cutting, channeling and feeding forward of the work. Although I intend to describe briefly the mechanism whereby these movements are brought about I lay no particular stress on these as any other means may be employed.

The work guide or gage 12 is carried by two vertically slidable bars 15 fitting in grooves in the cover plate 16 at the front of the machine. The upper ends of the bars 15 are provided with a suitably shaped cross bar 18 which is pressed upward by a spring 18$^a$ to hold said bar against a cam or inclined plane 17. The cam or inclined plane 17 (see Fig. 3) may consist of a recess or groove of gradually increasing depth cut in a disk so that the shoulder 17$^a$ will, when it contacts with the cross bar 18 (which has a part or finger entering the recess) prevent further movement of the cam in one direction. When the cam 17 is in this position the guide 12 is at its highest position and the projecting edge of the sole will be as narrow as it can be made. By rotating the cam clockwise the guide 12 will be depressed at a speed depending on the speed of rotation of the cam until the point 17$^b$ is reached which will give the maximum depression of the guide and consequently forms the limit of extreme width of sole edge to be obtained. To prevent the cam rotating beyond the last mentioned position I form its disk with an arc-shaped recess into which enters a stop 19 adjustably carried on a segmentally shaped bar or rod 19ª and which stop is shown at a position to permit the full movement of the cam but which may be adjusted on its bar to thereby prevent the cam being moved to its full extent or in other words to reduce to any predetermined extent the maximum width of the projecting sole edge which the machine shall for the time being be capable of producing.

The cam disk is carried on a sleeve like projection of a ratchet wheel 21 mounted on a spindle 22 and interposed between the adjacent faces of the cam disk and the wheel 21 is a friction washer 20—the two disks being pressed toward each other by a spring or springs—so that rotation of the wheel 21 will frictionally drive the cam disk. This is necessary so that the cam disk when either of its stops 17ª or 17ᵇ contacts with the bar 18 or stop 19 will be merely held stationary and the ratchet wheel 21 may still be rotated without risk of injury to the mechanism should the operator accidentally or purposely cause the ratchet wheel driving mechanism to continue to operate. At the other side of the ratchet wheel and loosely mounted on the spindle 22 is a lever 23 carrying a pawl block 24 having a pawl tooth at each end, either one of which may be put in engagement with the ratchet wheel 21 and thus rotate the latter in one or the other direction. Means are provided whereby the lever 23 may have imparted to it a greater or less throw so that the pawl in engagement with the ratchet wheel will rotate said ratchet wheel and through it the cam a greater or less distance for each rotation of the cam shaft. The means illustrated comprise a crank of variable throw the particular construction consisting in forming the end of the cam shaft with a diametrical slot to receive the tongue 30 (see Figs. 1 and 6) of a block 31ª which also is formed or provided with a crank pin 25 that enters a slot in the lever 23 (the crank pin being preferably provided with a sliding piece 25ª to slidably fit in the groove of the lever 23). The block 31ª is fixed on a slide 26 slidably fitting between guide plates or cheeks on a disk or face plate 27 having a tubular or sleeve like extension 27ª which rotatably fits in a horizontally slidable member 28 and whose internal diameter is larger (leaving a space 29 therearound) than the diameter of the main or cam shaft to permit the maximum amount of throw of which the crank pin is to be capable. By moving the slidable member 28 to one side or the other relatively to the shaft 1 the crank pin will be carried with it and rotation of the shaft 1 will cause the crank pin to rotate eccentrically (the slide 26 in the face plate 27 permitting this) and thus impart a vibratory movement to the lever 23 causing one or other of its pawls to intermittently rotate the ratchet wheel 21 and the cam. For every rotation of the cam shaft the crank pin will make two revolutions.

The adjustment of the slidable member 28 is to be effected by the operator during the operation of the machine and for this purpose I form the slide 28 with teeth 28ª with which is geared a toothed segment or lever 28ᶜ forming part of or an arm on a lever 31 fixed on a stud 29ª and the opposite end of which lever has pivotally connected to it a rod 31ᵇ which is so controlled by the knee lever or equivalent by any suitable mechanism not shown, that the movement of the knee lever say to the left will raise the rod 31ᵇ and thereby move the slide 28 (and with it the crank pin 25) to the left, whereas its movement in the opposite direction will by moving the rod 31ᵇ downward, move the slide 28 to the right. In order that the movement of the knee lever to one side or the other shall also determine the direction of rotation of the cam I fix a lever 33 on the stud 29ª which lever at its free end is provided with an arm 33ª carrying a roller 34 or equivalent which is held in contact with and presses on the lower face of the pawl block by a spring preferably placed at the point or connection of the arm 33ª to the lever 33. In Fig. 3 the parts are shown in the position that roller 34 holds the right hand pawl tooth in engagement with the ratchet wheel 21 and consequently the cam will be rotated intermittently in the anti-clockwise direction permitting the work guide to be moved upward. Should the knee lever be moved in the opposite direction past its normal position, the left hand pawl tooth will be made to engage with the ratchet wheel and the cam will be rotated in the clockwise direction causing the work guide to be moved intermittently downward. When the knee lever is released and assumes its normal position, as is usual, the lever 33 will be in a position to hold the roller 34 centrally between the two pawl teeth and both said teeth will be held out of engagement with the ratchet wheel and hence no movement of the cam will at such time take place. The back of the pawl block is preferably formed with a depression to receive the roller 34 when the latter is in its central position with respect to the pawl teeth.

In the example of my invention illustrated I provide adjustable stops 36, 37, to limit the extent of movement—either up or down—of which a stud 31ˣ which connects the rod 31ᵇ to the lever 31 shall be capable and consequently I place a limit to the amount of eccentricity which can for the time being be given to the crank pin 25 with respect of the cam shaft 1 so that the extent of movement for each rotation of said shaft of the pawl, ratchet wheel and cam will also be limited, and as this determines the speed of movement of the work guide relatively to the feed movement of the work the form of curve to be produced both as to increase and decrease of width of sole edge may be predetermined by the operator suitably adjusting the stops 36, 37. To enable the operator to know in what position to fix the stops 36, 37 so that the curves desired will be produced in or on the work, I may provide a properly marked scale whereby the operator may know just where the stops are to be fixed.

To enable the result described with reference to the diagrammatic illustration in Fig. 11 to be attained I provide means whereby the position of the stops 36, 37 will be automatically changed. Although I do not in any way limit myself to employ any particular means, a simple means consists in mounting the stops 36, 37 on a rotatable disk 39 which is so controlled that when the knee lever (or equivalent) has moved the pivot $31^x$ of the rod $31^b$ successively in contact with both stops 36, 37 the removal of the pivot from contact with the stop (37) with which it was last in contact will cause the automatic rotation of the disk through a half revolution and to be then locked until a further double movement of the knee lever has been made or at any rate until the for the time being lower one (in the example) of the stops has been utilized.

The means illustrated comprise a toothed wheel 70 which is constantly rotated in the direction of the arrow (Figs. 4 and 5) when the machine is in operation by a toothed wheel $70^a$ on the cam shaft and an idle wheel $70^b$ between them. Frictionally engaged with the disk 70 is the disk 39 having two notches 41 and $41^a$ diametrically opposite each other, with the, for the time being, lower one of which notches a spring pressed plunger 40 normally engages. Mounted on said disk and located diametrically thereof is a slide 38 capable of sufficient movement between its guide pieces as to move the plunger 40 out of engagement with the notch 41 or $41^a$ with which it happens to be in engagement. The slide 38 is held frictionally by a spring plate or washer $38^a$ and it has a segmental recess $38^b$ whereby the slight movement referred to is permitted. Mounted on said slide 38 are the stops 36, 37, which may be adjusted or set nearer to or farther from the normal position of the pivot $31^x$ and which adjustment will be made according to the shape of curves which are to be produced in or on the work. When a right boot or shoe is to be operated on the trimming begins at the inside waist with the guide in its highest position the projecting sole edge being thus made narrowest and is continued parallel with the crease or the last along the inside edge of the fore-part and around the toe portion. (The guide is adjustably mounted on its supports so that any desired width may be the "narrowest" width). The sole edge must then be made to gradually increase in width and for this purpose the operator moves the knee lever to one side—say the left—until the pin $31^x$ or a socket or equivalent on it contacts with the stop 36 which latter owing to the slow increase of width required will have been adjusted to be comparatively near the pin $31^x$ to thereby permit only a small throw of the crank pin 25. When the ball portion is reached and the sole edge is of the greatest width desired the operator moves the knee lever to its (for the time being) extreme opposite position and as the decrease in the width of sole edge has to be a quick or abrupt one the stop 37 will have been set some distance farther from the normal position of the pin $31^x$. The movement of the knee lever in said opposite direction has caused the slide 38 to press the plunger 40 back (as shown in Fig. 5) so that when the knee lever is next allowed to resume its normal position the disk 39 will be free to be rotated by the disk 70 until the recess or notch 41 is engaged by the plunger. By this the positions of the stops 36, 37 relatively to the pin $31^x$ will have been reversed and they will be in the proper position for enabling a left boot or shoe to be trimmed in which the trimming is begun at the outside waist the projecting edge being made narrow and parallel with the last at the waist and then a quick increase can be made by the operator moving the knee lever to the full extent of which it is capable to the left when the stop 37 will be operative and in due course turn to the right whereby a slow decrease in the width of the sole edge will be produced.

It will be seen that whether a right boot or shoe or a left one is to be trimmed the operator always moves the knee lever (or equivalent) first in one direction (say to the left) and then to the other. In order to enable the operator to know for which boot the machine is set or in other words what the position of the stops are relatively to the pin $31^x$, I provide the disk 39 with indicating tablets marked conveniently with the letters R and L respectively the upper one of which will let him know in the example illustrated that the machine is set to trim a right boot.

In order that the principle on which my invention is based may be clearly understood, I would refer first of all to the diagrammatic illustration given in Fig. 11. In said Fig. 11, G is a work guide to be moved vertically between guides $g, g$. C indicates a cam, inclined plane or equivalent which, when moved in a direction "a" moves the guide G (and with it the work) in one direction indicated by "A" whereas on the return movement (direction "b") of the cam or equivalent the guide G is made to move in the opposite direction "B," The arrow F indicates the line of normal work feed, and T, the position of the trimming knife relatively to which and to the direction of the work feed line F the guide G is to be moved vertically up or down. K indicates a knee lever in its normal position (*i. e.* the position it will take up if released) the movement of which in one direction say the left (during the operation of the machine) causes the cam or equivalent C to be moved in the direction "a," whereas the movement to the right will cause the cam or equivalent to move in the direction "b," thereby in the first instance, producing a movement of the guide G in the direction "A," and in the second instance in the direction "B." The extent of movement of the knee lever in either direction is to be assumed to determine the speed of movement (whether up or down) of the guide G. The lines L, R, indicate the absolute extreme positions (within the compass of the machine) to which the knee lever can be moved and at which the movement of the guide G will therefore be the most rapid. I provide means, for example stops S, S' one on each side of the knee lever whereby the extent of movement of the knee lever may be limited to be less than the extreme L and R. The stops S, S' are adjustable in a manner that the operator himself may determine the for the time being extreme extent of movement of which the knee lever shall be capable in each direction and by the adjustment of which stops the operator may consequently determine the, for the time being, extreme speed at which the cam, inclined plane or equivalent C and the guide G can move in either direction. If, for example, the stops S, S' be adjusted in such positions relatively to the normal position of the knee lever that the latter can be moved an extreme distance to the left which is twice that of the extreme distance it can be moved to the right, then on bringing the knee lever in contact with the stop S the guide G will move in the direction "A" at twice the speed that said guide will move in the direction "B" when subsequently, the knee lever is brought against stop S'. Although any desired limitation to the movement of the knee lever on either side may thus be effected and the operator can predetermine what, for the time being, shall be the extreme speed of movement of the guide G in the direction "A" as well as in the direction "B," yet, by moving the knee lever to any desired less extent than to its, for the time being, extreme, a less speed of movement in either direction of the guide G may be attained.

In Figs. 12 and 13 the line $d$ indicates the crease and the line $f$ the edge of the sole when trimmed. E is the point or part where the projecting sole edge when trimmed is widest, $e$ is the point at which the forepart joins the shank and $e'$ where the forepart joins or merges into the toe portion. As the boot is fed in the direction of the arrow $h$ the trimming operation in the case of the left boot must commence at the outside shank, say at $i$. When the point $e$ is reached the work must be made to move comparatively rapidly in the direction "A" while it is fed forward until the point E is reached to thereby produce the required abrupt or quick increase in the width of the projecting sole edge and then the work must be made to move slowly upward *i. e.* in the direction "B" as it is fed forward to thereby produce a gradual decrease in the width. To effect this, the stop S must be adjusted a suitable distance on the left of the knee lever so that the required comparatively rapid speed of movement in the direction "a" of the cam or equivalent C and in the direction "A" of the guide G will be attained when (the point $e$ having been reached) the knee lever is moved against said stop. As the speed of movement of the cam in the direction "a" and of the guide in the direction "A" is directly dependent upon the distance the knee lever it moved to the left, let "X" represent the speed of the cam and of the guide as well as representing the distance through which the knee lever is moved to the left. For the purpose of producing the more gradual decrease of sole width from the point E to the point $e'$, the stop S' must be adjusted on the right of the normal position of the knee lever at a distance therefrom which is proportionately less as compared with that at which the stop S was adjusted on the left to thereby, when the knee lever is brought against said stop S', produce the required comparatively slow movement of the cam or equivalent in the direction "b" and of the guide in the direction "B." Let "Y" represent this distance as well as the speed of movement of the cam or equivalent in the direction "b" and of the guide in the direction "B." For the left boot, therefore, the guide G must at the proper time be made to move first in the direction "A" at a comparatively quick speed "X" and then in the direction "B" at a slower speed "Y" both speeds "X" and "Y" being, it will be observed, the for the time being extreme speeds at which the guide G can be made to move in the directions "A" and "B" respectively and these are predetermined by the operator.

When the right boot (Fig. 13) is to be trimmed, the trimming operation must commence at the inside shank and the sole edge must be made to be parallel with and to extend the desired minimum distance from the crease all along the forepart and around the toe portion until the point $e'$ is reached (during this part of the trimming operation the knee lever remains in its normal position). Thereafter the width of projecting sole edge must be gradually increased until the point E is reached and then more quickly decreased. To obtain the gradual increase the knee lever must be moved to the left so that the guide G will be made to move in the direction "A" but it would not do to move the knee lever against the stop S while it is in the position where the operator has adjusted it because instead of a gradual an abrupt or quick increase in the width of the projecting sole edge would be obtained. The proper distance the knee lever must be moved is of course the distance "Y". Similarly when the point E is reached and the quick decrease is to be produced the knee lever must be moved to the right of its normal position a distance sufficient to thereby produce a comparatively quick movement of the guide in the direction "B"; but the stop "S", if allowed to remain in the position where the operator has adjusted it, would obviously prevent the said knee lever being moved the requisite distance whereby the required comparatively rapid movement of the guide G in the direction "B" may be attained. To obviate these difficulties I provide means whereby the positions of the stops S, S' will automatically be so changed after the one boot (in this instance the left boot) has been trimmed that the knee lever can be moved the requisite distance—but no farther—to cause the guide G to move at the necessary speeds in the directions "A" and "B" successively whereby the sole edge of the other boot of a pair (in this instance the right boot) may be produced. In other words when the sole of one boot (in this instance the left boot) is being trimmed the first movement of the knee lever must be to the left through a distance "X" whereby the guide G will be made to move in the direction "A" at an (for the time being and by the operator predetermined) extreme speed "X" and then the knee lever must be moved to the right of its normal position a distance "Y" whereby the guide will be made to move in the direction "B" at a (for the time being and by the operator independently predetermined) different extreme speed "Y", after which the positions of the stops will be automatically so changed that they will occupy the positions indicated by $S^3$ and $S^4$ so that when the sole of the next boot (in this instance the right boot) is being trimmed the knee lever in its first movement (to the left) can only move through the distance "Y" insuring thereby that the guide G will be made to move in the direction "A" at the speed "Y" whereas the knee lever may thereafter be moved to the right of its normal position a distance "X" and thus the guide caused to move in the direction "B" at the speed "X". When the right boot has been trimmed the stops will again be moved to bring them into the positions suitable to enable the sole edge of a left boot to be trimmed.

From the foregoing description it will be understood that the for the time being maximum speed of movement of the cam or equivalent in the direction "$a$" or "$b$" and that of the guide in the direction "A" or "B" may be any from nil to the maximum within the capacity of the machine and that such for the time being maximum speed can be predetermined by the operator so that the operator by merely adjusting the stops may produce any desired shape of "bulge".

From the foregoing description it will be seen that by my invention any combination of curves (within the capacity of the machine) producing, when the invention is applied to a rough rounding machine, any desired degree of increase and any desired different degree of decrease in the width of the projecting sole edge by a single cam or inclined plane may be attained and that the machine is adapted to trim boots and shoes not only of different sizes but of different styles. Of course by setting the stops at equal distances from their normal center equal curves of increase and decrease will be obtained.

I will now briefly describe the remainder of the rough rounding machine. The knife bar 43 is reciprocated directly by the cam race 9 through the roller shown, and is carried in bearings on a swinging frame or cradle 44 pivoted at $47^x$, see Figs. 1 and 10, which is operated through a system of levers consisting of a lever 45 and cam lever 46. The motion is imparted by the cam groove 7 and the knife is given a small movement about the pivot from side to side, a movement to the right occurring when the knife is in the extreme backward position and one to the left when the knife is forward against the abutment 11. The abutment 11 is carried by a bar 47 also sliding in the swinging frame 44 and partaking of its movement. The rear end of the bar 47 carries a roller 48 which receives motion from the cam 6, this motion serving to remove the cutting block from the face of the work on the return stroke after feeding has taken place. The channel knife 13 and the presser foot roll 14 are carried at the upper end of a vertical slide 49 (Figs. 1 and 2) which is connected by a chain to a treadle to enable the operator to vary the distance of the channel from the cut edge of the sole, the edge and the position of the channel having no fixed relation to one another, and thus rendering any mechanical connection with the automatic edge gage impossible. The vertical slide 49 fits into a block 50 mounted at the end of a slide bar 51 which is carried by a swinging lever 52 mounted on the machine head. The bar 51 is pressed outward by a spring and this serves to keep the roller 14 in contact with the surface of the sole. It may be held back to permit of the insertion of the work by the lever 53. The whole system is moved from right to left through a small distance to effect the feed, simultaneously with the knife bar cradle 44, and by a similar system of levers, operated by the cam race 8, consisting of levers 54, 55 and 56 (Figs. 9 and 1). The edge trimming knife and channel knife therefore coöperate to move the work forward, but the latter has a quick return movement while the cutting knife is still in the work and is stationary, and in this return movement the channel is cut. The driving and brake gear consists of a drum 57 keyed to the driving shaft and having upon its periphery a leather covered clutch surface adapted to engage with a corresponding surface inside the rim of the belt pulley 58. The interior face of the drum 57 is adapted to engage with an expanding brake 59.

In Fig. 1 the machine is shown in the driving position. The stop slide block 60 is directly connected to a treadle and a movement of this by the operator lifts the block and with it the roller 61 and the wedge 62. This allows the expanding shoe 59 to close up and release the drum 57 and at the same time, by means of the inclined surface at 63, the plungers 64 are allowed to move to the left and the belt pulley and cone clutch also move under the influence of the spring 65 and the pulley engages and starts the machine. When the machine is thus started the roller 61 rides upon the highest portion of the cam 66 and the wedge is prevented from descending except where the cam is cut away for this purpose. It follows therefore that the machine is brought up in one position, preferably with the knife retracted, the clutch being pushed out of gear at the same time by the plungers 64.

The construction described may be varied with advantage in several respects: the gage or guide is preferably adjustably mounted on the vertical bars 15 so that the minimum projection of the sole may be made more or less as may be desirable. The slide may also be provided with a scale to enable the proper adjustment of the stops to be effected having regard to the degrees of curvature to be produced.

What I claim as my invention and desire to secure by Letters Patent is:—

1. In a machine for rounding or trimming the soles of boots and shoes, the combination with a guide movable transversely to the line of normal work-feed for regulating the width and determining the curvature of the sole to be rounded or trimmed, of a single means under the control of the operator for varying the speed of movement of the said guide in its forward stroke and for reversing the direction of movement of the guide and changing its speed of movement in its rearward stroke for the purpose specified.

2. In a machine for rounding or trimming the soles of boots and shoes, the combination with a guide movable transversely to the line of normal work feed for regulating the width of the sole to be rounded or trimmed, of means for varying the speed of movement of said guide to determine the curvature of the sole, means under the control of the operator for reversing the direction of movement of the guide, and means coöperating with said last-named means for automatically controlling the speed of the guide after alternate reversals of its direction of movement in such a manner that a right sole may be rounded or trimmed immediately after a left sole and vice versa.

3. In a machine for rounding or trimming the soles of boots and shoes, the combination with a guide movable transversely to the line of normal work feed for regulating the width of the sole to be rounded or trimmed, of means for reversing the direction of movement of the guide, means for varying the speed of movement of said guide when moving in either direction to determine the curvature of the sole, a lever connected to said speed changing means, two adjustable stops for limiting the swing of said lever in opposite directions, and means for automatically reversing the positions of said stops after alternate reversals of the direction of movement of the guide for the purpose specified.

4. In a machine for rounding or trimming the soles of boots and shoes, the combination with a guide movable transversely to the line of normal work feed for regulating the width of the sole to be rounded or trimmed, of means for reversing the direction of movement of the guide, means for varying the speed of movement of said guide during its movement in either direction to determine the curvature of the sole, a lever connected to said speed changing means, and also to said direction reversing means, in such a manner that they may both be actuated simultaneously, two adjustable stops for limiting the swing of said lever in opposite directions, and means for automatically reversing the positions of said stops after alternate reversals of the direction of movement of the guide for the purpose specified.

5. In a machine for rounding or trimming the soles of boots and shoes, the combination with a guide movable transversely to the line of normal work feed for regulating the width of the sole to be rounded or trimmed, of means for reversing the direction of movement of the guide, means for varying the speed of movement of said guide during its movement in either direction to determine the curvature of the sole, a lever connected to said speed changing means, a rotary member, a disk connection by friction devices to said rotary member, whereby it will rotate therewith when free, said disk having notches at diametrically opposite points, a latch adapted to automatically engage said notches for locking said disk against turning, two adjustable stops on said disk for limiting the swing of said lever in opposite directions, and means for releasing said latch after alternate reversals of the direction of movement of the guide for the purpose specified.

6. In a machine for rounding or trimming the soles of boots and shoes, the combination with a guide movable transversely to the line of normal work feed for regulating the width of the sole to be rounded or trimmed, of means for reversing the direction of movement of the guide, means for varying the speed of movement of said guide during its movement in either direction to determine the curvature of the sole, a lever connected to said speed changing means, and also to said direction reversing means, in such a manner that they may both be actuated simultaneously, a rotary member, a disk connected by friction devices to said rotary member to rotate therewith when free, said disk having notches at diametrically opposite points, a latch adapted to automatically engage said notches for locking said disk against turning, two adjustable stops on said disk for limiting the swing of said lever in opposite directions, and means for releasing said latch after each full reciprocation of said lever, said direction reversing means being actuated by each movement of the lever in either direction.

In testimony whereof I have signed my name to this specification in the presence of two subscribing witnesses.

MARK THOMAS DENNE.

Witnesses:
    ARTHUR S. TALBOT,
    F. HOOD.

Copies of this patent may be obtained for five cents each, by addressing the "Commissioner of Patents, Washington, D. C."